(12) United States Patent
Nishiyama

(10) Patent No.: US 6,445,166 B2
(45) Date of Patent: Sep. 3, 2002

(54) POWER SUPPLY CIRCUIT IN WHICH RIPPLE REDUCING ABILITY IS MAINTAINED EVEN WHEN POWER SUPPLY VOLTAGE DROPS

(75) Inventor: Yasumasa Nishiyama, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/782,426

(22) Filed: Feb. 13, 2001

(30) Foreign Application Priority Data

Feb. 21, 2000 (JP) .................................. 2000-048975

(51) Int. Cl.[7] .............................................. G05F 1/40
(52) U.S. Cl. ..................... 323/266; 327/538; 327/382
(58) Field of Search .............................. 327/538, 382, 327/551; 323/266, 286

(56) References Cited

U.S. PATENT DOCUMENTS 5,126,652 A * 6/1992 Carlin ........................ 323/267
5,929,606 A * 7/1999 Faulk .......................... 320/143
6,304,131 B1 * 10/2001 Huggins et al. ............ 327/538

FOREIGN PATENT DOCUMENTS

JP   H05-244733   9/1993
JP   H08-140286   5/1996

* cited by examiner

Primary Examiner—Shawn Riley
(74) Attorney, Agent, or Firm—Brinks Hofer Gilson & Lione

(57) ABSTRACT

A power supply circuit includes a power supply voltage input terminal; a load voltage output terminal; a voltage stabilizer circuit having a first voltage input terminal and a first voltage output terminal, which stabilizes a voltage input to the first voltage input terminal and which outputs a rated voltage from the first voltage output terminal; and a ripple reducing circuit having a second voltage input terminal and a second voltage output terminal, which reduces ripple in a voltage input to the second voltage input terminal and outputs from the second voltage output terminal. The first voltage input terminal and the second voltage input terminal are connected to the power supply voltage input terminal, while the first voltage output terminal and the second voltage output terminal are connected to the load voltage output terminal. The voltage stabilizer circuit is activated when a power supply voltage input to the power supply voltage input terminal is a predetermined value or higher, while the ripple reducing circuit is activated when the power supply voltage is lower than the predetermined value.

6 Claims, 3 Drawing Sheets

POWER SUPPLY CIRCUIT IN WHICH RIPPLE REDUCING ABILITY IS MAINTAINED EVEN WHEN POWER SUPPLY VOLTAGE DROPS

BACKGROUND OF THE INVENTION

1. Field of the Invention

The present invention relates to power supply circuits. More specifically, the present invention relates to a power supply circuit which is particularly suitable for supplying a voltage to, for example, a voltage-controlled oscillator in a cellular phone.

2. Description of the Related Art

FIG. 4 is a circuit diagram of a conventional power supply circuit. The power supply circuit includes a voltage stabilizer circuit 31 and a ripple reducing circuit 32, each implemented in the form of an integrated circuit. The voltage stabilizer circuit 31 has a first voltage input terminal 31a, a first voltage output terminal 31b, and a first control voltage input terminal 31c. When a high-level control signal is applied to the first control voltage input terminal 31c, a voltage input to the first voltage input terminal 31a is stabilized to a particular voltage, for example, 3 volts, before being output from the first voltage output terminal 31b. The first control voltage input terminal 31c is connected to a power supply voltage input terminal 33. The power supply voltage input terminal 33 is supplied with a voltage, for example, 3.6 volts, from a power supply (not shown), for example, a battery.

The ripple reducing circuit 32 has a second voltage input terminal 32a, a second voltage output terminal 32b, and a second control voltage input terminal 32c. When a high-level control voltage is applied to the second control voltage input terminal 32c, a voltage input to the second voltage input terminal 32a is caused to have reduced ripple before being output from the second voltage output terminal 32b. The second control voltage input terminal 32c is connected to the power supply voltage input terminal 33. The second voltage input terminal 32a is connected to the first voltage output terminal 31b of the voltage stabilizer circuit 31. The second voltage output terminal 32b is connected to a load voltage output terminal 34. The load voltage output terminal 34 is connected to a load (not shown), for example, a voltage-controlled oscillator.

In accordance with the above configuration, the minimal voltage drop between the first voltage input terminal 31a and the first voltage output terminal 31b of the voltage stabilizer circuit 31 is on the order of 0.15 volt. Thus, when the power supply voltage is 3.15 volts or higher, a voltage of 3 volts is constantly output from the first voltage output terminal 31b; however, when the power supply voltage is below 3.15 volts, a voltage which is 0.15 volt lower than the power supply voltage is output from the first voltage output terminal 31b.

The minimal voltage drop between the second voltage input terminal 32a and the second voltage output terminal 32b of the ripple reducing circuit 32 is on the order of 0.25 volt. Thus, a voltage which is 0.25 volt lower than a voltage input to the second voltage input terminal 32a is output from the second voltage output terminal 32b.

When the power supply circuit is used in, for example, a cellular phone, the battery is often used for a period long enough to render the output voltage of the voltage stabilizer circuit 31 lower than the rated voltage (3 volts), for example, as low as 2.5 volts.

When the voltage stabilizer circuit 31 outputs a voltage below the rated voltage, the voltage stabilizer circuit 31 diminishes its ability to reduce ripple, as shown in FIG. 5, increasing ripple which enters the ripple reducing circuit 32. Then, the ripple reducing circuit 32 fails to sufficiently remove the ripple, thus outputting a voltage containing considerable ripple to the load voltage output terminal 34.

Consequently, C/N ratio decreases for signals generated by the voltage-controlled oscillator (or other types of signal generator) connected to the load voltage output terminal, thereby degrading performance of the cellular phone.

SUMMARY OF THE INVENTION

Accordingly, it is an object of the present invention to provide a power supply circuit in which the ripple reducing ability is maintained even when an output of a voltage stabilizer circuit in the power supply circuit drops below a rated voltage due to a decrease in power supply voltage.

To this end, the present invention provides a power supply circuit including a power supply voltage input terminal; a load voltage output terminal; a voltage stabilizer circuit having a first voltage input terminal and a first voltage output terminal, which stabilizes a voltage input to the first voltage input terminal and which outputs a rated voltage from the first voltage output terminal; and a ripple reducing circuit having a second voltage input terminal and a second voltage output terminal, which reduces ripple in a voltage input to the second voltage input terminal and outputs from the second voltage output terminal. In the power supply circuit, the first voltage input terminal and the second voltage input terminal are connected to the power supply voltage input terminal, while the first voltage output terminal and the second voltage output terminal are connected to the load voltage output terminal. The voltage stabilizer circuit is activated when a power supply voltage input to the power supply voltage input terminal is a predetermined value or higher, while the ripple reducing circuit is activated when the power supply voltage is lower than the predetermined value.

Preferably, in the power supply circuit, the voltage stabilizer circuit further has a first control voltage input terminal to which a high-level control signal for activating the voltage stabilizer circuit is applied, while the ripple reducing circuit further has a second control voltage input terminal to which a high-level control signal for activating the ripple reducing circuit is applied. The power supply voltage input terminal and the first control voltage input terminal are connected via a first switching device, while the power supply voltage input terminal and the second control voltage input terminal are connected via a second switching device. The first switching device is turned on and the second switching device is turned off when the power supply voltage is the predetermined value or higher, while the first switching device is turned off and the second switching device is turned on when the power supply voltage is lower than the predetermined value.

More preferably, the power supply circuit further includes a voltage divider circuit for dividing a voltage output from the first voltage output terminal to produce a divided voltage. The first switching device is implemented by a first PNP transistor and the second switching device is implemented by a second PNP transistor, the emitters of each of the first and second PNP transistors being connected to the power supply voltage input terminal, the collector of the first PNP transistor being connected to the first control voltage input terminal and to the base of the second PNP transistor, the collector of the second PNP transistor being connected to the second control voltage input terminal. The divided voltage is applied to the base of the first PNP transistor, the divided voltage being so determined that the first PNP transistor is turned on when the power supply voltage is the predetermined value or higher and is turned off when the power supply voltage is lower than the predetermined value.

More preferably, in the power supply circuit, the predetermined value of the power supply voltage is the sum of the rated voltage of the voltage stabilizer circuit and a voltage drop between the second voltage input terminal and the second voltage output terminal of the ripple reducing circuit.

Thus, even when the power supply voltage drops to such an extent that the voltage stabilizer circuit no longer outputs a rated voltage, a voltage substantially free of ripple is output from the ripple reducing circuit, which serves to expand the life of a battery for the power supply. In accordance with the decrease in the power supply voltage, the voltage stabilizer circuit and the ripple reducing circuit are automatically switched therebetween for operation, without changing the output voltage of the power supply circuit at the time of switching.

DESCRIPTION OF THE PREFERRED EMBODIMENT

A preferred embodiment of the present invention will now be described with reference to the accompanying drawings.

Figure 1:
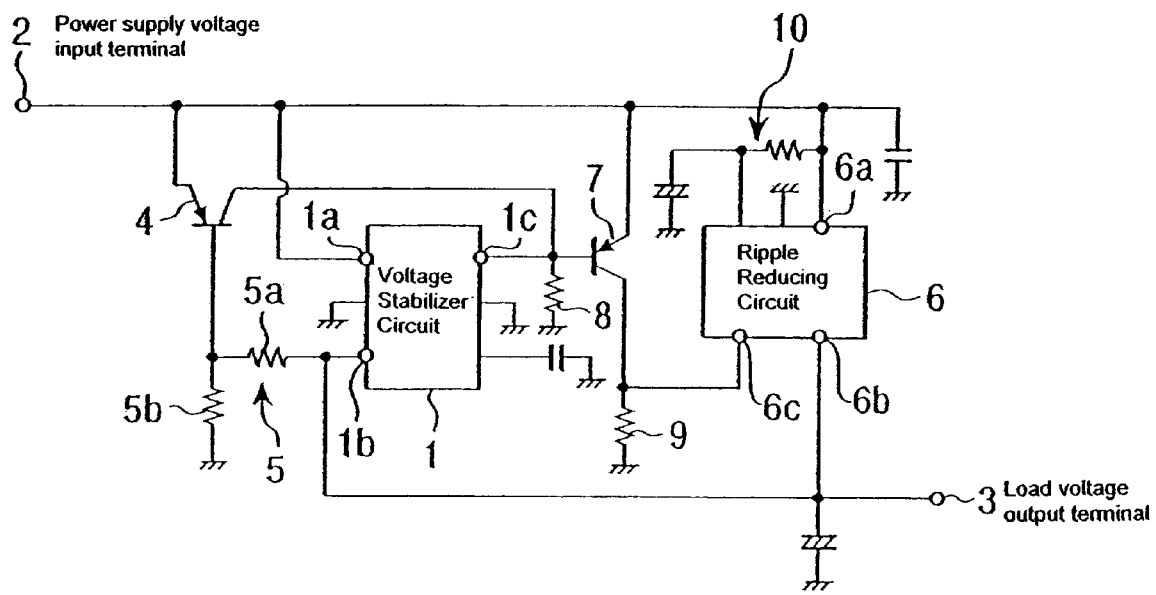
FIG. 1 is a circuit diagram of a power supply circuit according to an embodiment of the present invention.

FIG. 1 is a circuit diagram of a power supply circuit according to the preferred embodiment. Referring to FIG. 1, the power supply circuit includes a voltage stabilizer circuit 1 implemented in the form of an integrated circuit. The voltage stabilizer circuit has a first voltage input terminal 1a, a first voltage output terminal 1b, and a first control voltage input terminal 1c. When a high-level control voltage is applied to the first control voltage input terminal 1c, a voltage input to the first voltage input terminal 1a is stabilized to a particular voltage before being output from the first voltage output terminal 1b. The output voltage is substantially free of ripple.

The minimal voltage drop between the first voltage input terminal 1a and the first voltage output terminal 1b of the voltage stabilizer circuit 1 is on the order of 0.15 volt. Thus, assuming that the rated output voltage to be output from the first voltage output terminal 1b is 3 volts, if the voltage which is input to the first voltage input terminal 1a is 3.15 volts or higher, the rated output voltage, i.e., 3 volts, is output from the first voltage output terminal 1b; on the other hand, if the voltage which is input to the first voltage input terminal 1a is lower than 3 volts, a voltage which is 0.15 volt lower than the input voltage is output from the first voltage output terminal 1b.

The first voltage input terminal 1a is connected to a power supply voltage input terminal 2, and the first voltage output terminal 1b is connected to a load voltage output terminal 3. The power supply voltage input terminal 2 is supplied with a voltage, for example, 3 volts, from a power supply (not shown), for example, a battery. The load voltage output terminal 3 is connected to a load (not shown), for example, a voltage-controlled oscillator. Between the power supply voltage input terminal 2 and the first control voltage input terminal 1c, there is provided a first PNP transistor 4 as first switching means. The emitter of the first PNP transistor 4 is connected to the power supply voltage input terminal 2, and the collector of the PNP transistor 4 is connected to the first control voltage input terminal 1c. Between the first voltage output terminal 1b and the ground, there is provided a voltage divider circuit 5 constituted of two resistors 5a and 5b connected in series with each other. A divided voltage obtained by the voltage divider circuit 5, i.e., a voltage at the node between the resistors 5a and 5b, is supplied to the base of the first PNP transistor 4.

The power supply circuit also includes a ripple reducing circuit 6 implemented in the form of an IC. The ripple reducing circuit 6 has a second voltage input terminal 6a, a second voltage output terminal 6b, a second control voltage input terminal 6c. When a high-level control voltage is applied to the second control voltage input terminal 6c, a voltage input to the second voltage input terminal 6a is caused to have reduced ripple before being output from the second voltage output terminal 6b. The minimal voltage drop between the second voltage input terminal 6a and the second voltage output terminal 6b is on the order of 0.25 volt. Thus, a voltage output from the second voltage output terminal 6b is always 0.25 volt lower than the voltage input to the second voltage input terminal 6a. The second voltage input terminal 6a is connected to the power supply voltage input terminal 2, and the second voltage output terminal 6b is connected to the load voltage output terminal 3. Between the power supply voltage input terminal 2 and the second control voltage input terminal 6c, there is provided a second PNP transistor 7 as second switching means. The emitter of the second PNP transistor 7 is connected the power supply voltage input terminal 2, and the collector of the second PNP transistor is connected to the second control voltage input terminal 6c.

The base of the PNP transistor 7 is connected to the first control voltage input terminal 1c of the voltage stabilizer circuit 1, and is connected via a resistor 8 to the ground. The collector of the second PNP transistor is also connected to the ground via a resistor 9. The ripple reducing circuit 6 is provided with a filter 10 for reducing ripple.

Although the minimal voltage drop in the voltage stabilizer circuit 1 is 0.15 volt, when the voltage input to the first voltage input terminal 1a is on the order of 0.15 volt higher than the rated voltage, ripple tends to appear in the voltage output from the first voltage output terminal 1b. The input voltage should be maintained above a level which is on the order of 0.25 volt higher than the rated voltage in order that the voltage stabilizer circuit 1 exhibits a ripple reducing ability equivalent to that of the ripple reducing circuit 6.

Accordingly, the divided voltage of the voltage divider circuit 5 is so determined that the first PNP transistor 4 is turned on until the voltage on the first voltage input terminal 1a drops to 3.25 volts and is turned off when the voltage is below 3.25 volts; thus, the divided voltage is set to 2.55 (3.25–0.7) volts.

In accordance with the above configuration, the first PNP transistor 4 remains turned on until the power supply voltage drops to 3.25 volts; accordingly, a voltage substantially equivalent to the power supply voltage, i.e., a high-level signal, is applied to the first control voltage input terminal 1c. Thus, the rated voltage, i.e., 3 volts, is output from the first voltage output terminal 1b. Meanwhile, the second PNP transistor 7 is turned off. Thus, a low-level signal (0 volt) is applied to the second control voltage input terminal 6c, inhibiting the output of voltage from the second voltage output terminal 6b. Accordingly, the rated output voltage, i.e., 3 volts, is fed from the first voltage output terminal 1b of the voltage stabilizer circuit 1 to the load (not shown). In this state, the impedance at the second voltage output terminal 6b is very high; thus, the voltage output from the first voltage output terminal 1b is prevented from being applied to the second voltage output terminal 6b.

On the other hand, when the power supply voltage drops below 3.25 volts, the first PNP transistor 4 is turned off. Then, the voltage at the first control voltage input terminal 1c of the voltage stabilizer circuit 1 falls to a low level (0 volt), inhibiting the output of voltage from the first voltage output terminal 1b. Meanwhile, the second PNP transistor 7 is turned on. Thus, a voltage substantially equivalent to the power supply voltage, i.e., a high-level signal, is applied to the second control voltage input terminal 6c of the ripple reducing circuit. Accordingly, a voltage which is substantially free of ripple is output from the second voltage output terminal 6b. In this state, the impedance at the first voltage output terminal 1b of the voltage stabilizer circuit 1 is very high; thus, the voltage output from the second voltage output terminal 6b is prevented from being applied to the first voltage output terminal 1b.

When operation switches from the voltage stabilizer circuit 1 to the ripple reducing circuit 6 at a power supply voltage of 3.25 volts, since the voltage drop in the ripple reducing circuit 6 is 0.25 volt, the ripple reducing circuit 6 outputs a voltage of 3 volts, which is equivalent to the voltage output from the voltage stabilizer circuit 1 before operation is switched. Thus, output voltage of the power supply circuit does not change at the time of switching.

When the power supply voltage is below 3.25 volts, a voltage which is 0.25 volt lower than the power supply voltage is output from the second voltage output terminal 6b.

Figure 2:
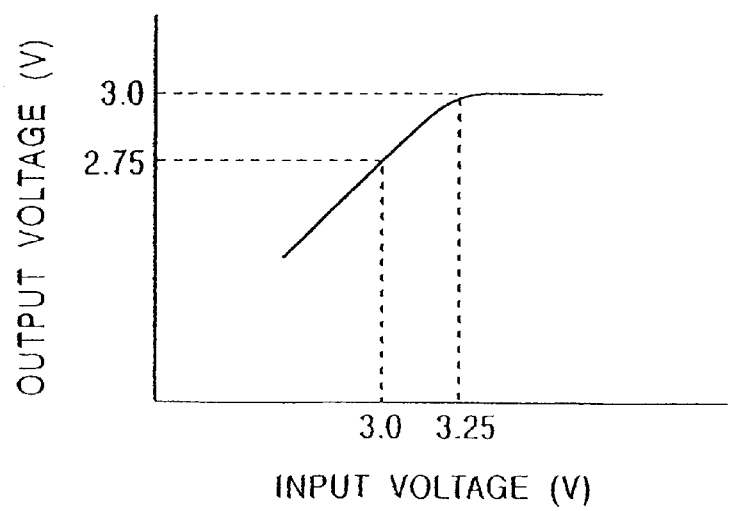
FIG. 2 is a graph showing input-output characteristics of the power supply circuit according to the embodiment.

As shown in FIG. 2, the output voltage (i.e., voltage on the load voltage output terminal 3) is constantly 3 volts until the input voltage (i.e., power supply voltage) drops to 3.25 volts, and is 0.25 volt lower than the input voltage when the input voltage is below 3.25 volts.

Figure 3:
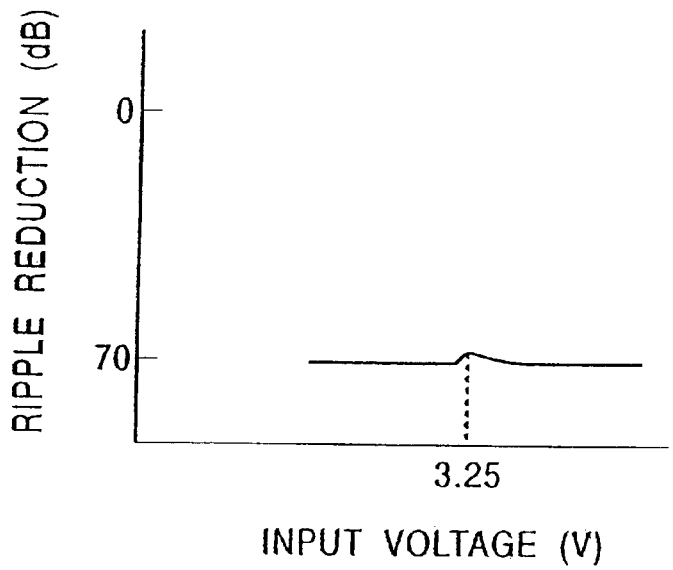
FIG. 3 is a graph showing ripple reduction characteristics of the power supply circuit according to the embodiment.
Figure 4:
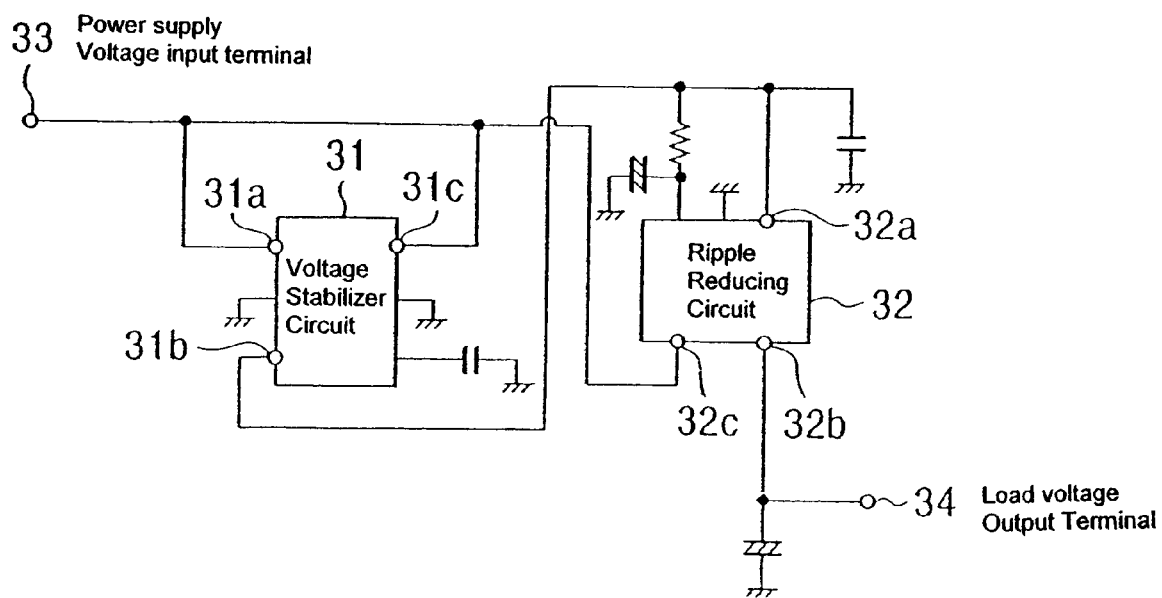
FIG. 4 is a circuit diagram of a conventional power supply circuit.
Figure 5:
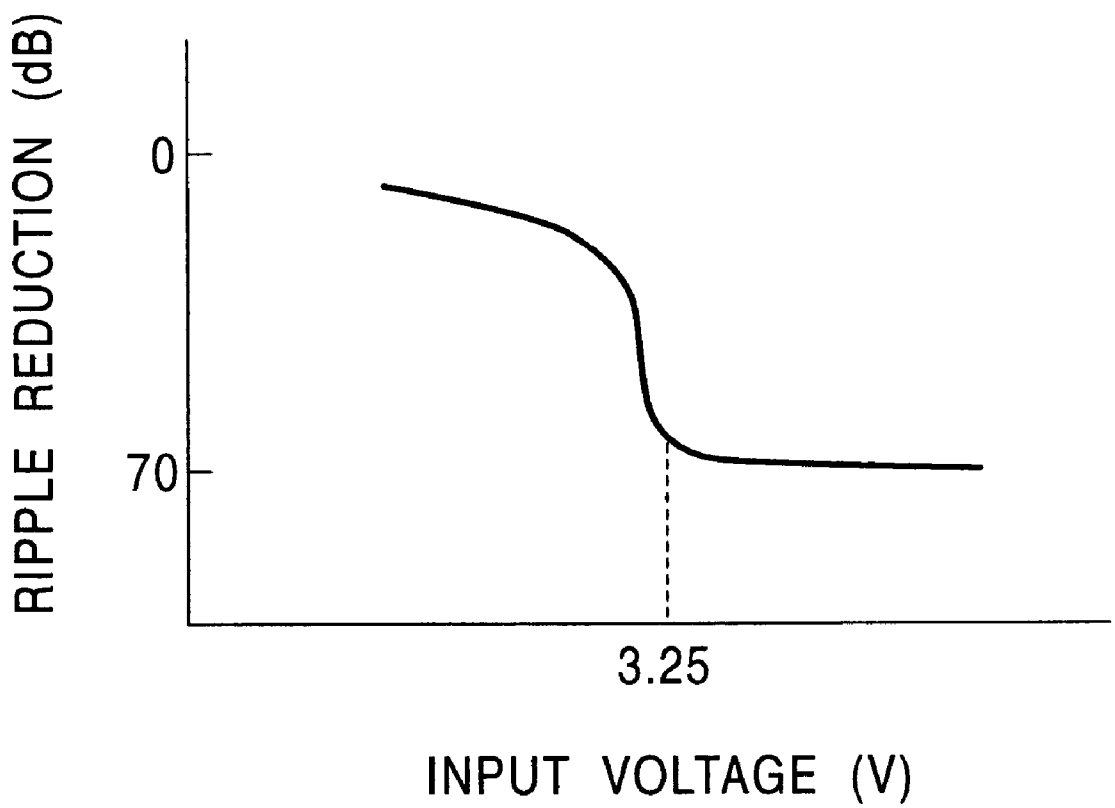
FIG. 5 is a graph showing ripple reduction characteristics of the conventional power supply circuit.

As shown in FIG. 3, ripple is reduced in the voltage stabilizer circuit 1 until the input voltage drops to 3.25 volts, and is reduced in the ripple reducing circuit 6 when the input voltage is below 3.25 volts.

Accordingly, even when the power supply voltage, for example, from a battery, drops to on the order of 3 volts, the voltage output to the load voltage output terminal 3 is substantially free of ripple, although the voltage is somewhat lower. If, for example, a voltage-controlled oscillator is connected as the load, a voltage on the order of 2.75 volts is sufficient for satisfactory performance. Thus, the battery can be used for a longer period, in this case, until the battery voltage drops to 3 volts.

What is claimed is:

1. A power supply circuit comprising:
   a power supply voltage input terminal;
   a load voltage output terminal;
   a voltage stabilizer circuit having a first voltage input terminal and a first voltage output terminal, which stabilizes a voltage input to said first voltage input terminal and which outputs a rated voltage from said first voltage output terminal; and
   a ripple reducing circuit having a second voltage input terminal and a second voltage output terminal, which reduces ripple in a voltage input to said second voltage input terminal and outputs from said second voltage output terminal,
   wherein said first voltage input terminal and said second voltage input terminal are connected to said power supply voltage input terminal, while said first voltage output terminal and said second voltage output terminal are connected to said load voltage output terminal, and wherein said voltage stabilizer circuit is activated and said ripple reducing circuit is deactivated when a power supply voltage input to said power supply voltage input terminal is at least a predetermined value, so that a voltage output from said voltage stabilizer circuit is output to said load voltage output terminal, while said ripple reducing circuit is activated and said voltage stabilizer circuit is deactivated when said power supply voltage is lower than said predetermined value, so that a voltage output from said ripple reducing circuit is output to said load voltage output terminal.

2. A power supply circuit according to claim 1, wherein said voltage stabilizer circuit further has a first control voltage input terminal to which a high-level control signal for activating said voltage stabilizer circuit is applied, while said ripple reducing circuit further has a second control voltage input terminal to which a high-level control signal for activating said ripple reducing circuit is applied, wherein said power supply voltage input terminal and said first control voltage input terminal are connected via a first switch, while said power supply voltage input terminal and said second control voltage input terminal are connected via a second switch, and wherein said first switch is turned on and second switch is turned off when said power supply voltage is at least said predetermined value, while said first switch is turned off and said second switch is turned on when said power supply voltage is lower than said predetermined value.

3. A power supply circuit according to claim 2, further comprising:
   a voltage divider circuit for dividing a voltage output from said first voltage output terminal to output a divided voltage,
   wherein said first switch is implemented by a first PNP transistor and said second switch is implemented by a second PNP transistor, emitters of each of said first and second PNP transistors being connected to said power supply voltage input terminal, a collector of said first PNP transistor being connected to said first control voltage input terminal and to a base of said second PNP transistor, a collector of said second PNP transistor being connected to said second control voltage input terminal, and wherein said divided voltage is applied to a base of said first PNP transistor, said divided voltage being so determined that said first PNP transistor is turned on and said second PNP transistor is turned off when said power supply voltage is at least said predetermined value and said first PNP transistor is turned off and said second PNP transistor is turned on when said power supply voltage is lower than said predetermined value.

4. A power supply circuit according to claim 1, wherein said predetermined value of said power supply voltage is a sum of said rated voltage of said voltage stabilizer circuit and a voltage drop between said second voltage input terminal and said second voltage output terminal of said ripple reducing circuit.

5. A power supply circuit according to claim 2, wherein said predetermined value of said power supply voltage is a sum of said rated voltage of said voltage stabilizer circuit and a voltage drop between said second voltage input terminal and said second voltage output terminal of said ripple reducing circuit.

6. A power supply circuit according to claim 3, wherein said predetermined value of said power supply voltage is a sum of said rated voltage of said voltage stabilizer circuit and a voltage drop between said second voltage input terminal and said second voltage output terminal of said ripple reducing circuit.

* * * * *